US012587478B2

(12) United States Patent
Akhbarizadeh et al.

(10) Patent No.: US 12,587,478 B2
(45) Date of Patent: Mar. 24, 2026

(54) SOFTWARE ASSISTED IMPLEMENTATION OF CONGESTION SIGNALING

(71) Applicant: Google LLC, Mountain View, CA (US)

(72) Inventors: Mohammad Jafar Akhbarizadeh, San Jose, CA (US); Weida Huang, Mountain House, CA (US); Abhiram Ravi, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 139 days.

(21) Appl. No.: 18/599,662

(22) Filed: Mar. 8, 2024

(65) Prior Publication Data

US 2025/0286818 A1 Sep. 11, 2025

(51) Int. Cl.
H04L 47/12 (2022.01)
H04L 47/26 (2022.01)

(52) U.S. Cl.
CPC .............. H04L 47/12 (2013.01); H04L 47/26 (2013.01)

(58) Field of Classification Search
CPC ......... H04L 47/12; H04L 47/26; H04L 47/10; H04L 47/17; H04L 47/31; H04L 47/11
See application file for complete search history.

(56) References Cited

U.S. PATENT DOCUMENTS

| | | | | |
|---|---|---|---|---|
| 8,811,183 | B1 * | 8/2014 | Anand | H04L 49/1515 |
| | | | | 370/237 |
| 9,444,754 | B1 * | 9/2016 | Noureddine | H04L 47/31 |
| 12,170,619 | B1 * | 12/2024 | Bansod | H04L 47/12 |
| 2004/0052212 | A1 * | 3/2004 | Baillargeon | H04L 1/0002 |
| | | | | 370/328 |

| | | | | |
|---|---|---|---|---|
| 2012/0051216 | A1 * | 3/2012 | Zhang | H04L 47/26 |
| | | | | 370/230 |
| 2013/0128735 | A1 | 5/2013 | Li et al. | |
| 2014/0153387 | A1 * | 6/2014 | Wu | H04L 47/36 |
| | | | | 370/252 |
| 2014/0223053 | A1 * | 8/2014 | Yoshida | G06F 13/362 |
| | | | | 710/110 |
| 2015/0295827 | A1 * | 10/2015 | Zhu | H04L 47/11 |
| | | | | 370/230 |

FOREIGN PATENT DOCUMENTS

EP 3267639 B1 12/2019

OTHER PUBLICATIONS

A. Ravi, et al: Congestion Signaling, published Feb. 2, 2024, https://datatracker.ietf.org/doc/draft-ravi-ippm-csig/.
Extended European Search Report for European Patent Application No. 25160628.1 dated Jul. 8, 2025. 10 pages.
Ravi et al. Congestion Signaling (CSIG) draft-ravi-ippm-csig-00. Aug. 31, 2023. Networking Working Group, Internet-Draft. 43 pages. Retrieved from the Internet: <https://tools.ietf.org/html/draft-ravi-ippm-csig-00>.

* cited by examiner

*Primary Examiner* — Benjamin M Thieu
(74) *Attorney, Agent, or Firm* — Lerner David LLP

(57) ABSTRACT

Congestion signaling by receiving a packet at a node, the packet comprising a congestion signal tag including a congestion signal value, the congestion signal value having been set by another node among one or more other nodes through which the packet has traveled; comparing the congestion signal value to a mask that is determined according to a local signal value; and replacing the congestion signal value with the local signal value when the comparing indicates that the node is a bottleneck for the packet relative to the another node.

16 Claims, 7 Drawing Sheets

100

100

200

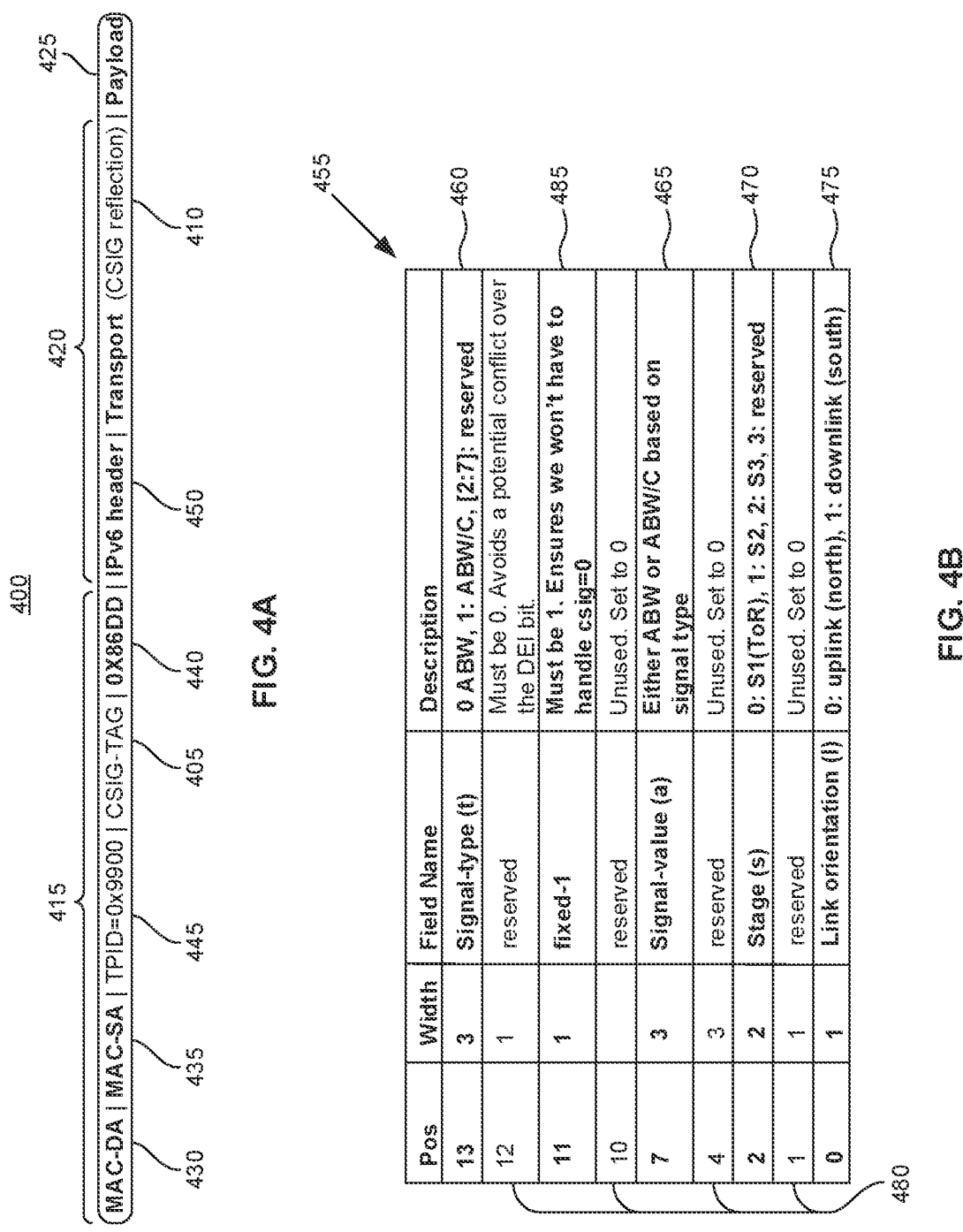

400

| MAC-DA | MAC-SA | TPID=0x9900 | CSIG-TAG | 0X86DD | IPv6 header | Transport (CSIG reflection) | Payload |

| Pos | Width | Field Name | Description |
|---|---|---|---|
| 13 | 3 | Signal-type (t) | 0 ABW, 1: ABW/C, [2:7]: reserved |
| 12 | 1 | reserved | Must be 0. Avoids a potential conflict over the DEI bit. |
| 11 | 1 | fixed-1 | Must be 1. Ensures we won't have to handle csig=0 |
| 10 | 1 | reserved | Unused. Set to 0 |
| 7 | 3 | Signal-value (a) | Either ABW or ABW/C based on signal type |
| 4 | 3 | reserved | Unused. Set to 0 |
| 2 | 2 | Stage (s) | 0: S1(ToR), 1: S2, 2: S3, 3: reserved |
| 1 | 1 | reserved | Unused. Set to 0 |
| 0 | 1 | Link orientation (l) | 0: uplink (north), 1: downlink (south) |

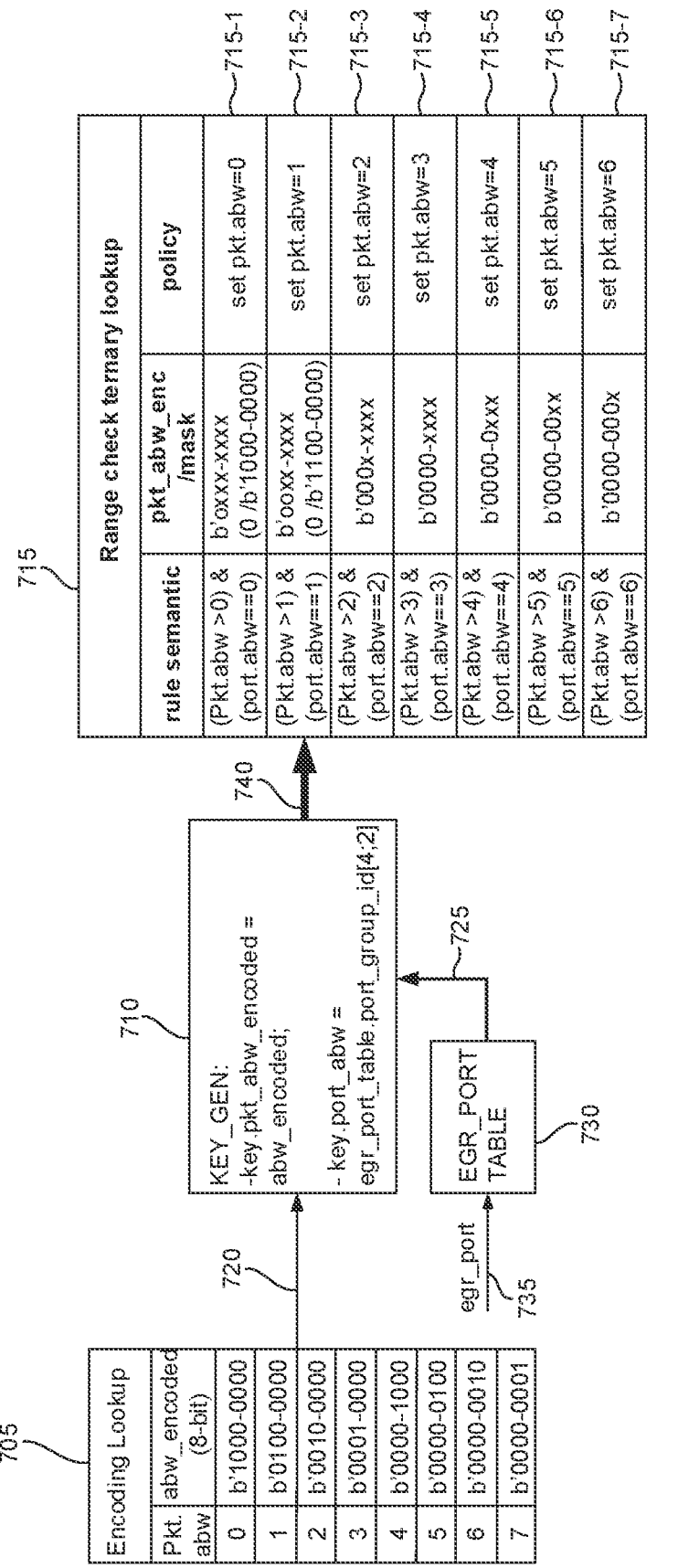

Encoding Lookup (705)

| Pkt. abw | abw_encoded (8-bit) |
|---|---|
| 0 | b'1000-0000 |
| 1 | b'0100-0000 |
| 2 | b'0010-0000 |
| 3 | b'0001-0000 |
| 4 | b'0000-1000 |
| 5 | b'0000-0100 |
| 6 | b'0000-0010 |
| 7 | b'0000-0001 |

KEY_GEN: (710)
- key.pkt_abw_encoded = abw_encoded;
- key.port_abw = egr_port_table.port_group_id[4:2]

(720)

EGR_PORT TABLE (730)

egr_port (735)

(725)

(740)

Range check ternary lookup (715)

| rule semantic | pkt_abw_enc /mask | policy | |
|---|---|---|---|
| (Pkt.abw >0) & (port.abw==0) | b'oxxx-xxxx (0 /b'1000-0000) | set pkt.abw=0 | 715-1 |
| (Pkt.abw >1) & (port.abw==1) | b'ooxx-xxxx (0 /b'1100-0000) | set pkt.abw=1 | 715-2 |
| (Pkt.abw >2) & (port.abw==2) | b'000x-xxxx | set pkt.abw=2 | 715-3 |
| (Pkt.abw >3) & (port.abw==3) | b'0000-xxxx | set pkt.abw=3 | 715-4 |
| (Pkt.abw >4) & (port.abw==4) | b'0000-0xxx | set pkt.abw=4 | 715-5 |
| (Pkt.abw >5) & (port.abw==5) | b'0000-00xx | set pkt.abw=5 | 715-6 |
| (Pkt.abw >6) & (port.abw==6) | b'0000-000x | set pkt.abw=6 | 715-7 |

FIG. 7

SOFTWARE ASSISTED IMPLEMENTATION OF CONGESTION SIGNALING

BACKGROUND

Many network control loops, such as congestion control, traffic engineering, and network operations, make decisions based on the congestion experienced by application flows. However, the signals currently used to determine congestion are often implicitly derived from end-to-end signals, approximated over larger timescales than desired, or obtained out-of-band from the network, which leads to poor congestion control and the attendant drawbacks of suboptimal application performance and inefficient network usage. At the same time, applications are becoming more demanding, and their appetite for fast network performance is rising. For example, many newer artificial intelligence/machine learning (AI/ML) applications require fast network transfers to avoid idling expensive tensor processing units (TPUs) and graphics processing units (GPUs). Similarly, storage disaggregation requires fast network transfers to make remote storage devices appear local.

BRIEF SUMMARY

It has been recognized that without explicit information from networks, end-to-end congestion control algorithms (CCAs) have come to rely on heuristics that can lead to network flow rates that either undershoot or overshoot the bottleneck bandwidth which can, in turn, lead to slower flow completion times (FCTs), increased round-trip times (RTTs), and/or packet losses. In particular, it has been recognized that there continue to be blind spots for current CCAs regarding opportunities to increase flow rates. For example, current CCAs are deficient as to determining the appropriate starting rate for a flow and the rate at which flow can increase without experiencing congestion.

In view of the desire for improved CCAs, the presently disclosed technology is provided.

In accordance with the presently disclosed technology, a network node is configured to enable congestion control of network traffic using congestion signaling across a variety of hosts executing congestion control algorithms relying on provided congestion signals. The configured node, e.g., a network interface card (NIC) of a data center or host machine, or a network switch, can facilitate congestion control to reduce network bottlenecks, while allowing the network to communicate at line rate. The technology provides compare-and-replace support for congestion signal values that are reported in the same packets as that of a running application, so as to maintain the size of the packets through which the values are reported and thereby minimize the burden that congestion control signaling places on the network. In addition, the technology provides access to a variety of different congestion signals that may be used as input by implemented CCAs, to manage packets on a per-connection basis, or even a per-packet basis. In this regard, a node can make decisions on congestion control using selected signals which provide information related to, for example, a minimum available path bandwidth and load, and max hop delay.

Moreover, the presently disclosed technology may be implemented on legacy network hardware. Accordingly, the technology provides for compare-and-replace congestion signaling, for diverse types of congestion signals, at line rate on legacy network hardware such as legacy switches.

In one aspect, the presently disclosed technology provides a congestion signaling method including receiving a packet at a node, the packet having a congestion signal tag including a congestion signal value, the congestion signal value having been set by another node among one or more other nodes through which the packet has traveled; comparing the congestion signal value to a mask that is determined according to a local signal value; and replacing the congestion signal value with the local signal value when the comparing indicates that the node is a bottleneck for the packet relative to the another node.

In another aspect, the presently disclosed technology provides a node including at least one ingress port to receive a packet, the packet having a congestion signal tag including a congestion signal value, the congestion signal value having been set by another node among one or more other nodes through which the packet has traveled; and at least one egress port, communicatively coupled to the ingress port, to compare the congestion signal value to a mask that is determined according to a local signal value, replace the congestion signal value with the local value when the comparing indicates that the egress port is a bottleneck for the packet relative to the another node, and forward the packet to a next node.

BRIEF DESCRIPTION OF THE DRAWINGS

The accompanying drawings are not intended to be drawn to scale. Also, for purposes of clarity not every component may be labeled in every drawing. In the drawings:

FIG. 4A shows an ethernet frame representation depicting possible positions for a congestion signal tag and a congestion signal reflection.

FIG. 4B is a table depicting an illustrative format for a congestion signal tag.

FIG. 7 is a flow diagram showing an example of compare-and-replace processing performed at a node according to an embodiment.

DETAILED DESCRIPTION

Overview

Figure 1:
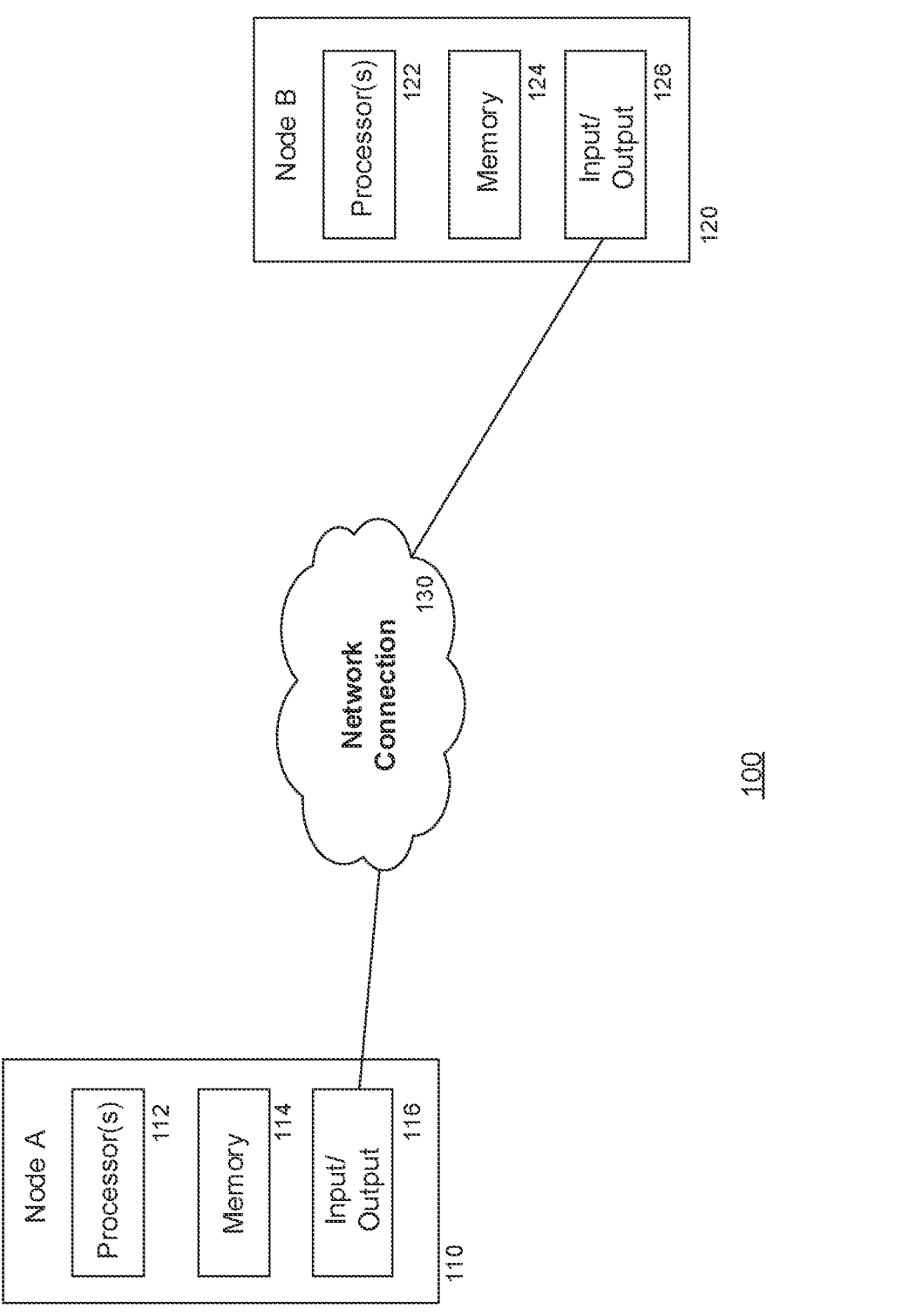
FIG. 1 illustrates an example communication network in which the presently disclosed technology may be employed.

The currently disclosed technology concerns network congestion control through network congestion signals provided to network nodes at line rate. To this end, congestion signals of the technology are compare-and-replace style signals that are provided to nodes in the same packets as that of a running application. For example, congestion signals of the technology may be provided to a NIC hardware (H/W) transport within a server. In this manner, the NIC can enable support for congestion signaling on every packet, in hardware. Moreover, the congestion signal types for a connection between the NIC and another node may be determined by a rate update engine (RUE), and the NIC may receive and transmit the congestion signals from H/W to the RUE. The RUE may be implemented in hardware, software, or a combination of the two. The RUE may be programmable.

Using the presently disclosed technology, communication between network nodes can ramp up quickly to maximally use all network bandwidth and to complete close to the ideal time. For instance, the presently disclosed technology can provide for improved execution of transfer of data, for example in support of various workloads, including machine learning (ML) accelerated tasks. Further, a NIC as configured herein can enable multipath flows to choose paths with the most available bandwidth. The NIC can also offload valuable information for traffic engineering and/or debugging purposes, such as operational bottlenecks within a network.

Traffic Engineering (TE) also benefits from congestion control as described herein. In accordance with the presently disclosed technology, a NIC can identify congested points and flows experiencing congestion right away, which in turn can lead to more efficient and timely provisioning for bursty traffic. By contrast, inferring the congested flows through an offline process via superimposition of network traffic stats, topological information and routing information, has been a much longer process.

Aspects of the presently disclosed technology can also assist with debugging network level performance of datacenter applications. For instance, large scale applications including ML training workloads open thousands of connections at the transport layer, and upon a network slowdown identifying the bottleneck hops without joining many data sources across switches and hosts has been extremely difficult. However, with the present technology, because a node can receive path bottleneck characteristics, network choke points can be promptly identified which, in turn, leads to better bandwidth provisioning, timely repair processes, etc.

Technical advantages of the presently disclosed technology include explicit congestion signaling within a fleet of interconnected devices. The technology also allows for signaling of minimum available path bandwidth (or "bottleneck bandwidth") and load, which can be used for telemetry and congestion control purposes. In addition, the presently disclosed technology also provides for compare-and-replace support for congestion signaling between nodes at line rate, as well as reduced overhead for implementation relative to prior congestion control signaling techniques.

In some examples, programmable rate update engines can be adapted to receiving and processing diverse signal types. Support for congestion control (CC) and telemetry/debugging may be implemented in hardware, obviating the need to specify support in software. A rate update engine implemented as part of a NIC may be configured to support different signals specified by a congestion signal packet tag, on a per-connection basis, or a per-packet basis. In other words, the NIC may handle congestion control according to different parameters provided by tagged packets handled across multiple different connections. The congestion control is programmable and allows for efficiently communicating signals from a hardware transport to programmable software (S/W). The rate update engine can apply different signal types to outgoing packets.

In accordance with the presently disclosed technology, a NIC can be configured on a per-connection basis to support diverse types of congestion signals. The NIC can include an option to not provide congestion signals to outgoing packets, allowing the NIC to perform sampling within RTT time scales or to not insert congestion signals when the recipient device does not support the same type of congestion signaling.

A NIC according to the presently disclosed technology can support an array of entries corresponding to different congestion signal types. The NIC can dynamically choose indexes of the array of entries to enable congestion signaling of a particular type, and specify an initial value for the congestion signal. Once the NIC indicates an entry which is not equivalent to turning off congestion signaling, then the NIC would add in corresponding headers on every outgoing packet. Along the same lines, the NIC can disable congestion signaling by choosing the appropriate index.

Congestion signaling according to the presently disclosed technology may be used in a NIC/RUE on a per-connection basis for purposes of congestion control, telemetry, multipathing, load balancing and debuggability. The NIC/RUE can also make congestion signaling visible to an application stack, perhaps in some summarized way. Similarly, the NIC/RUE can summarize and make congestion signals visible to software-defined networking (SDN) systems, such as a traffic engineering controller.

Example Systems

Examples of systems and methods are described herein. It should be understood that the words "example," "exemplary" and "illustrative" are used herein to mean "serving as an example, instance, or illustration." Any embodiment or feature described herein as being an "example," "exemplary" or "illustration" is not necessarily to be construed as preferred or advantageous over other embodiments or features. In the following description, reference is made to the accompanying figures, which form a part thereof. In the figures, similar symbols typically identify similar components, unless context dictates otherwise. Other embodiments may be utilized, and other changes may be made, without departing from the spirit or scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

FIG. 1 illustrates an example communication network 100 in which the presently disclosed technology may be employed. The communication network 100 includes one or more nodes which may represent various computing devices connected to one another via a network connection. In the example of FIG. 1, a first node 110 and a second node 120 are shown as being connected via network connection 130. Each of the nodes 110, 120 may include a respective processor 112, 122, memory 114, 124, and communication device 116, 126 for receiving inputs and transmitting outputs. The processor 112, 122 can be a well-known type of processor or one of the lesser-known types of processors. Alternatively, the processor 112, 122 can be a dedicated controller such as an application-specific integrated circuit (ASIC), such as a Tensor Processing Unit (TPU). Further, the processor 112, 122 may, in some examples, be a type of GPU or field programmable gate array (FPGA).

The memory 114, 124 can store information accessible by the processor 112, 122, including data that can be retrieved, manipulated or stored by the processor, instructions that can be executed by the processor, or a combination thereof. The memory 114, 124 may be a type of non-transitory computer readable medium capable of storing information accessible by the processor 110, 120 such as a hard-drive, solid state drive, tape drive, optical storage, memory card, ROM, RAM, DVD, CD-ROM, write-capable, or read-only memories. In some examples, the memory 114, 124 is a type of physically stacked memory, or a type of high bandwidth memory (HBM).

Although FIG. 1 functionally illustrates the processor 112, 122 and corresponding memory 114, 124 of each node as being included within a single block, the processor and memory may actually include multiple processors and memories that may or may not be stored within the same physical housing. For example, some of the data and instructions can be stored on a removable CD-ROM and others within a read-only computer chip. Some or all of the instructions and data can be stored in a location physically remote from, yet still accessible by, the processor. Similarly, the processor can actually include a collection of processors, which may or may not operate in parallel.

The communication device 116, 126 for each node of the communication network may facilitate communication between the node and other remote devices that are in communication with the node. The remote devices may include other nodes of the communication network 100, one or more user devices in communication with the node, or any combination thereof. The communication device 116, 126 may be capable of transmitting data to and from other computers such as modems (e.g., dial-up, cable or fiber optic) and wireless interfaces. For example, each node may receive communications via the network connection 130, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

The network connection 130 between the nodes 110 120 of the communication network 100 may support multiple layers of communication protocols implemented by the respective processors 112, 122 of the nodes. For example, each node may support communication using an open systems interconnection (OSI) model. Further, congestion control signaling for an OSI connection between the nodes 110 and 120 may be implemented in packets of one or more running applications by tagging packets at various layers of the OSI connection between nodes 110 and 120.

Figure 2:
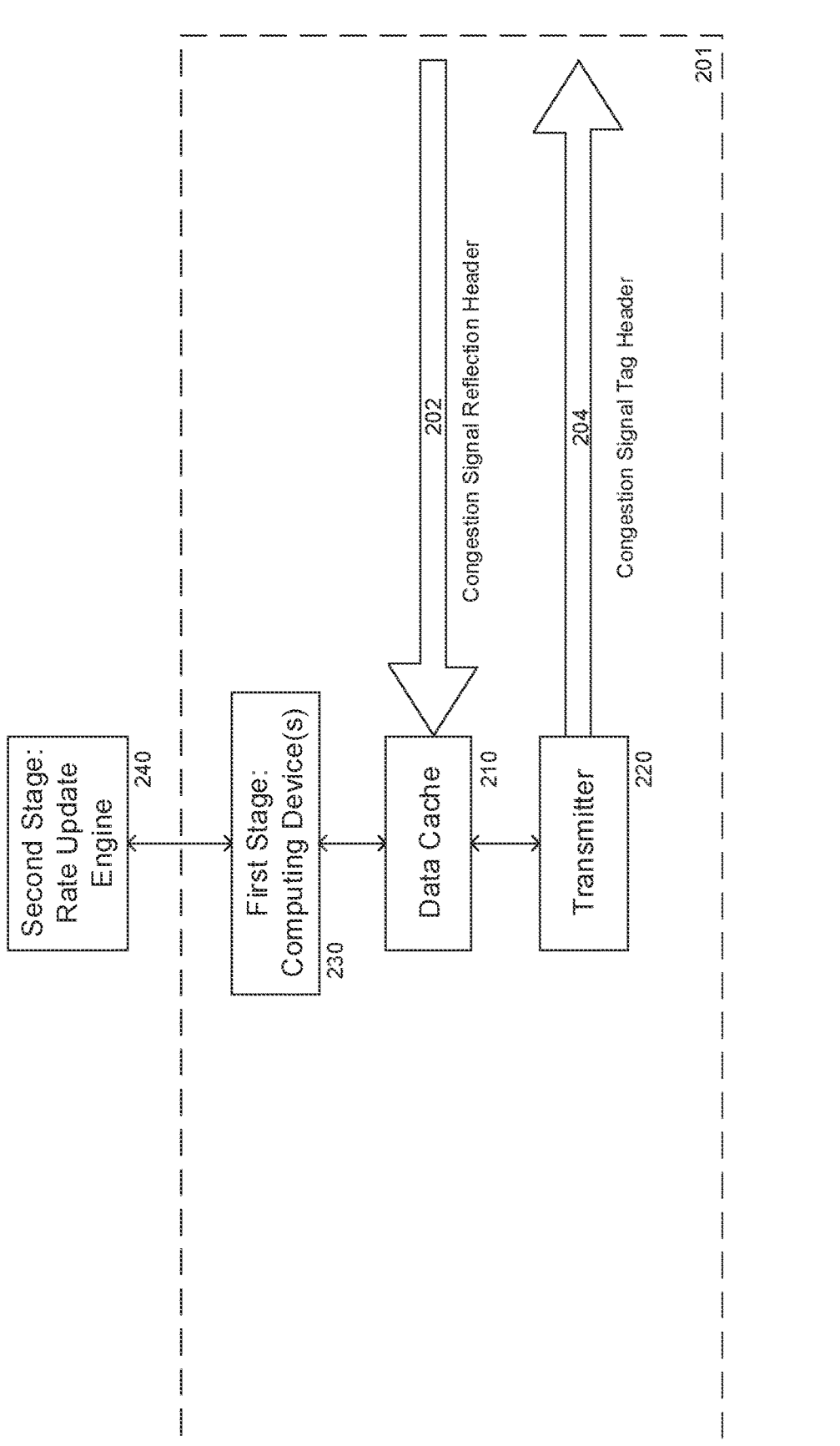
FIG. 2 is a block diagram of a system for congestion control within a communication network such as the communication network of FIG. 1.

FIG. 2 is a block diagram of a system 200 for congestion control within a communication network, such as the communication network 100 of FIG. 1. The system 200 of FIG. 2 may be included in a first node of the communication network, such as Node A 110 of FIG. 110 of FIG. 1, and may or may not be included within a NIC of the first node. In any event, the system 200 may be configured to control congestion at a second node of the communication network, such as Node B 120 of FIG. 1, by gathering information from the second node, and possibly other nodes, and updating a rate of packet transmission to the second node based on the gathered information. In a more specific example, when a packet communication connection exists between Node A 110 and Node B 120, and packets are communicated between Node A 110 Node B 120 through intermediate nodes or devices (collectively "transit devices"), Node A 110 may collect congestion information from Node B 210 and/or from the transit devices through congestion signals carried in the packets.

As can be seen from FIG. 2, a main data path 201 is configured to transmit data between the first and second nodes bidirectionally. At the first node, a stream of incoming packets 202 may be received along the main data path 201 and temporarily stored at the memory of the first node, represented as data cache 210 in FIG. 2. A stream of outgoing packets 204 may be transmitted along the main data path 201 by the communication device of the first node, represented as a transmitter 220 in FIG. 2. The outgoing packets 204 may selectively include a configuration signal tag header, as noted in FIG. 2. For example, outgoing packets 204 (or "transmission packets") that are to be transmitted to a second node may be modified by one or more processors of the system 200 to add a congestion signal tag header to one or more of the transmission packets prior to transmission. The congestion signal tag header may specify one or more congestion signal types and, for each of the congestion signal types, specify an initial congestion signal value. Regarding the incoming packets 202, they may include one or more return packets generated by the second node in response to receipt of the transmission packets having the congestion signal tag header and including a congestion signal reflection header, as noted in FIG. 2. The congestion signal reflection header may include one or more return congestion signal values, with the return congestion signal values corresponding respectively to the congestion signal types.

The return packets received from the second node over the incoming stream 202 and stored at the data cache 210 may be analyzed to determine whether the rate of packet transmission to the second node should be updated. The analysis may be divided into two distinct stages. At a first stage, a determination is made as to which of the return congestion signal values should be selected for use in determining whether to initiate a rate update event. This first stage may be implemented using one or more computing devices 230 included in hardware of the first node and communicatively coupled to the main data path 201. At a second stage, a determination is made, based on the selected return congestion signal values, as to whether transmission rate control is necessary. When transmission rate control is necessary, the second stage controls a transmission rate for transmission of packets from the first node to the second node.

The second stage may be implemented using a rate update engine 240 that is separate from the main data path 201. For example, data from the incoming stream 201 may be stored separately from the data cache 210, and the rate update engine 240 may analyze the separately stored data in order to determine the updated parameters for data packet transmission. Separating the congestion control process between these two stages helps to offload processing from the main data path, and thus improves performance over the main data path. Other advantages of offloading the congestion control process include increased flexibility in defining the congestion control algorithm, and in at least some examples increased flexibility in controlling whether rate update events are initiated. These and other aspects of the two-stage congestion control process are described in greater detail herein.

It should be noted that in some embodiments both the first stage and the second stage of return packet analysis may be performed by the RUE 240. That is, the RUE may be configured to determine which of the return congestion signal values should be selected for use in determining whether to initiate a rate update event, determine whether transmission rate control is necessary, and control the transmission rate for transmission of packets from the first node to the second node. In such embodiments the one or more computing devices 230 are not needed.

Figure 3:
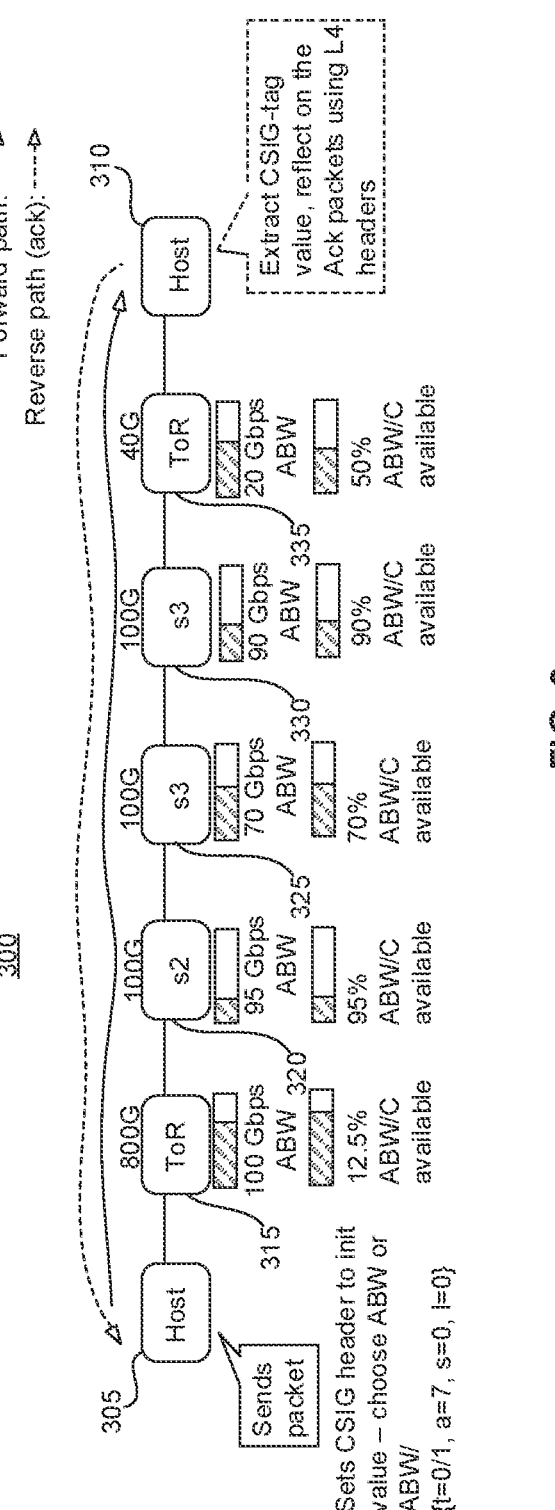
FIG. 3 shows an illustrative path that a packet takes through a network to travel from a sending host to a receiving host.

Turning now to FIG. 3, the figure shows an illustrative path 300 that a packet takes through a network to travel from a sending host 305 to a receiving host 310. As can be seen from FIG. 3, the packet may travel through a number of other network nodes 315, 320, 325, 330, and 335 to get from the sending host 305 to the receiving host 310. More specifically, the packet may travel from sending host 305 to receiving host 310 by traveling from the host 305 to a first top of rack switch 315, from the first top of rack switch 315 to a first level-2 switch 320, from the first level-2 switch 320 to a level-3 switch 325, from the level-3 switch 325 to a second level-2 switch 330, from the second level-2 switch 330 to a second top of rack switch 335, and from the second top of rack switch 335 to the receiving host 310. As can be further seen from FIG. 3, each of the nodes 315, 320, 325, 330, and 335 has a bandwidth capacity and a utilization status at the time the packet passes through the node. For example, the first top of rack switch 315 has a bandwidth capacity of 800 Gbps, and the first top of rack switch 315 has a utilization status of 700 Gbps when the packet passes through, such that there is 100 Gbps of bandwidth, or 12.5% of the bandwidth capacity, available at the first top of rack switch 315 when the packet passes through.

To monitor congestion along the path 300, the sender host 305 may include a congestion signal tag in the packet. The congestion signal tag may include a signal type indicator indicating the type of congestion to be monitored and a congestion signal value corresponding to the signal type. Further, the sender host 305 may provide an initial value for the congestion signal value. In the FIG. 3 example, the signal type indicator is a bit denoted by the letter "t," with one of the bit values indicating that available bandwidth (ABW) is to be monitored (i.e., that the signal type is ABW) and the other one of the bit values indicating that available bandwidth as a fraction of bandwidth capacity (ABW/C) is to be monitored (i.e., that the signal type is ABW/C). The congestion signal value is denoted by the letter "a" and is initialized by the sender host. 305 By way of example if ABW is to be monitored, and the range of ABW is bucketized into 8 possible buckets (0-7), the sender host may set a=7 to initialize the ABW to the highest possible value. In any case, as the packet travels along path 300, each of the nodes 315, 320, 325, 330, and 335 compares the congestion signal value with a local signal value indicative of the node's utilization status, and if the local signal value is less than the congestion signal value, replaces the congestion signal value with the local signal value. In this manner, as the packet travels along the path 300, at each node, the congestion signal value is compared with a local signal value, and when the comparing indicates that the node is a bottleneck for the packet relative to the nodes already traversed, the congestion signal value is replaced with the local signal value. Thus, the final congestion signal value (i.e., the congestion signal value received at receiver host 310 and reflected to the sender host 305) will be the minimum value for ABW or ABW/C, as the case may be, among the nodes traversed by the packet (i.e., nodes 315, 320, 325, 330, and 335).

In addition, the congestion signal tag may include a stage indicator and a link orientation indicator. The stage indicator indicates the path stage of the node corresponding to the congestion signal value, and link orientation indicator indicates the link orientation (i.e., uplink or downlink) of the node corresponding to the congestion signal value. Both the stage indicator and the link orientation indicator may be initialized by the sender host 305. In the FIG. 3 example, the stage indicator and the link orientation indicator are initialized to 0 to indicate the stage of the sender host 305 and the link orientation of the sender host. Then, as the packet travels along the path 300, when comparison of the congestion signal value to the local signal value at a node indicates that the node is a bottleneck for the packet, not only is the congestion signal value replaced with the local signal value, but the stage indicator is replaced with the stage indicator of node and the link orientation indicator is replaced with the link orientation of the node. So, for instance, if the ABW local signal value of level-3 switch 325 is less than the ABW congestion signal value received at switch 325, then the ABW congestion signal value is replaced with the ABW local signal value, and the stage indicator is replaced with a stage indicator of "3" corresponding to the level-3 switch 325 and the link orientation indicator is replaced with the link orientation of the level-3 switch 325.

In any event, when the packet reaches the receiver host 310, the receiver host 310 may extract the congestion signal value from the congestion signal tag and insert the extracted congestion signal value into a congestion signal reflection. The receive host 310 may include the congestion signal reflection, for example, in the header of an acknowledgement packet. Further, the acknowledgement packet including such congestion signal reflection may be transmitted to the sender host 305 via the same path 300 traversed by the packet bearing the congestion signal tag or via a path other than path 300, although the path followed does not impact the congestion signal reflection carried by the acknowledgement packet.

FIG. 4A is referenced to discuss illustrative positions within a packet of a congestion signal tag and a congestion signal reflection. FIG. 4A shows an ethernet frame representation 400 depicting such positions for a congestion signal tag 405 and a congestion signal reflection 410. As can be seen from FIG. 4A, the ethernet frame 400 may include an OSI level 2 header portion 415, an OSI level 4 header portion 420, and a payload portion 425. The congestion signal tag 405 may be included in the OSI level 2 header portion 415. Also included in the OSI level 2 header portion 415 is a destination media access control (MAC) address 430, a source MAC address 435, and an ether type 440. As an option, a Tag Protocol Identifier (TPID) 445 may be included in the level 2 header portion 415 as well. The TPID 445 may be indicative of the format of the congestion signal tag 405 so that nodes (e.g., nodes 305 to 335 of FIG. 3) can readily read from and write to the congestion signal tag, and so that new versions/formats of the congestion signal tag can be readily implemented.

The congestion signal reflection 410 may be included in the OSI level 4 header portion 420 of the ethernet frame 400. Further, the congestion signal reflection 410 may be included in an options section portion of the OSI level 4 header portion 420, which is distinct from a non-options section 450 of the OSI level 4 header portion 420.

FIG. 4B is a table 455 depicting an illustrative format for a congestion signal tag. The congestion signal tag may be, for example, congestion signal tag 405 of FIG. 4A. As can be seen from FIG. 4B, a congestion signal tag may include a congestion signal type 460 of three bit width, a congestion signal value 465 of three bit width, a stage indicator 470 of two bit width, and a link orientation indicator 475 of 1 bit width. The congestion signal tag may also include a number of reserved fields 480, that may be assigned functions which are yet to be determined, and a fixed-1 field. The fixed-1 field ensures that the congestion signal value 465 will not be 0. The fixed-1 field is advantageous in embodiments that implement compare-and-replace using the virtual local area network (VLAN) capabilities of switches because the field prevents the switches from implementing VLAN 0 priority tagging treatment for frames that carry congestion signal tags including the field, thereby avoiding undesirable corner cases.

Figure 5:
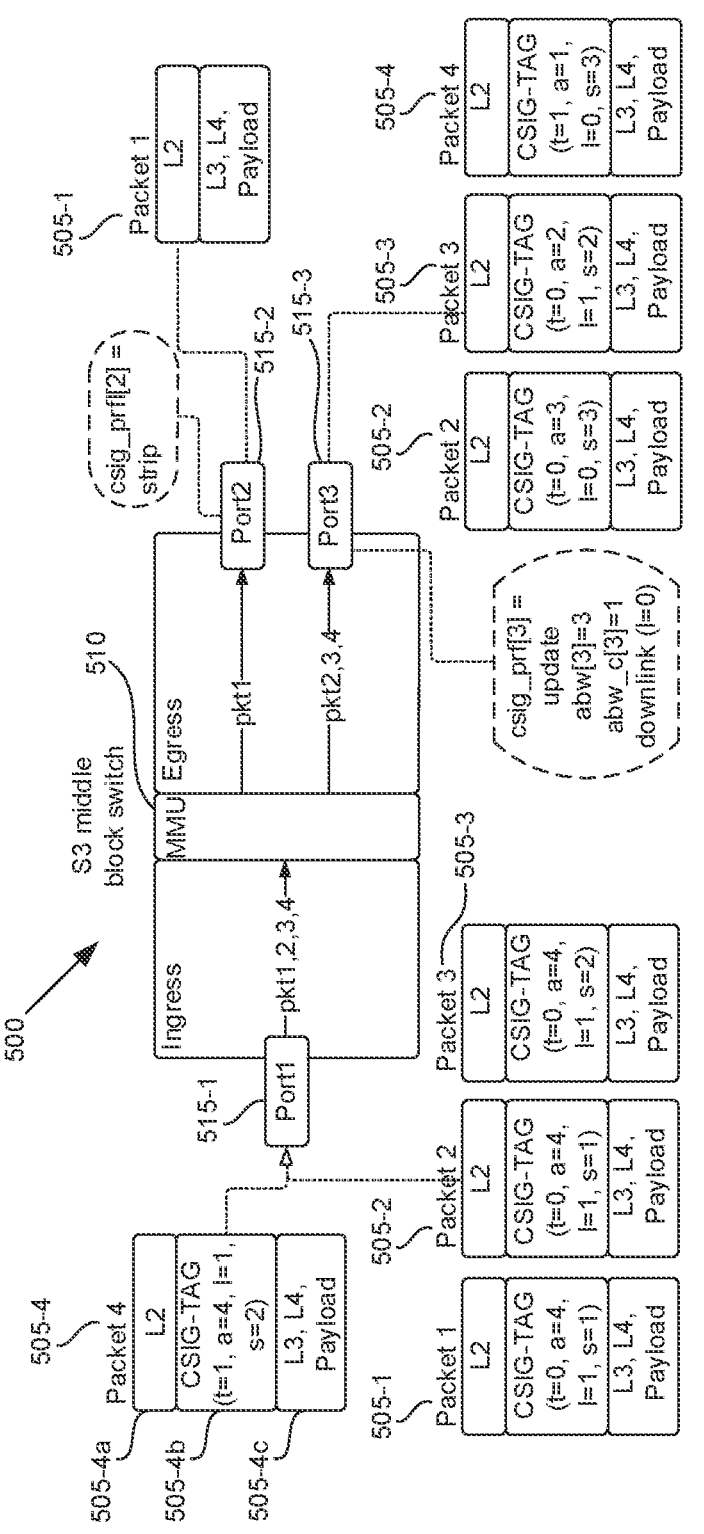
FIG. 5 shows a switch and a number of packets to illustrate how congestion signal tags of the packet may be processed by the switch.

Turning now to FIG. 5, the figure shows a switch 500 and a number of packets 505-1, 505-2, 505-3, and 505-4. The switch 500 may serve, for example, as node 325 in the FIG. 3 configuration. The packets 505-1 to 505-4 are shown with respective OSI level 2 header information, congestion signal tags, and OSI level 3/level 4 payloads. For instance, packet 505-4 includes OSI level 2 header information 505-4a, congestion signal tag 505-4b, and OSI level 3/level 4 payload 505-4c. Further, the packets 505-1 to 505-4 are depicted both as they are when they enter the switch 500 and as they are when they leave the switch 500. The switch 500 is a level-3 switch having a memory management unit (MMU) 510, an ingress port 515-1 and two egress ports, 515-2 and 515-3 Nevertheless, it should be noted that the FIG. 5 depiction of a level-3 switch with a single ingress port and two egress ports is chosen for purposes of ease of description, and that the nodes of the presently disclosed technology are not limited to level-3 switches and are not limited to one ingress port or two egress ports.

As can be seen from FIG. 5, each of egress ports 515-2 and 515-3 has a congestion signal profile. That is, software in the switch 500 is programmed to perform congestion signal processing on packets transmitted from the egress ports 515-2 and 515-3 according to respective procedures and/or parameters. In the FIG. 5 example, egress port 515-2 does not support congestion signaling and thus for packets transmitted from egress port 515-2, the switch 500 strips the congestion signal tag from the packets. Accordingly, since packet 505-1 is transmitted from egress port 515-2, the congestion signal tag is stripped from packet 505-1 prior to transmission. In this manner, packet 505-1 is prevented from carrying inaccurate congestion signal information, e.g., in the event that switch 500 is bottleneck relative to other nodes traversed by the packet 505-1 but the switch 500 cannot indicate as such in the congestion signal tag of packet 505-1 because egress port 515-2 does not support congestion signaling.

By contrast, egress port 515-3 is configured to update the congestion signal value of a packet it transmits when a comparison of the local signal value at egress port 515-3 to the congestion signal value indicates that switch 500 is a bottleneck relative to other nodes traversed by the packet. In the FIG. 5 example, egress port 515-3 has a bucketized ABW local signal value of 3 and a bucketized ABW/C local signal value of 1. Therefore, with t=0 indicating a congestion signal type of ABW and t=1 indicating a congestion signal type of ABW/C, when packet 505-2 is to be transmitted from egress port 515-3 the ABW local signal value of 3 is substituted for the ABW congestion signal value of 4 because 3 is lower than 4 and such values indicate that the switch 500 is a bottleneck for packet 505-2. Further, since the congestion signal tag of packet 505-2 is changed to substitute the ABW local signal value of for the ABW congestion signal value, the congestion signal tag of packet 505-2 is also changed to include the link orientation indicator of egress port 515-3 and the stage indicator of egress port 515-3. Accordingly, the link orientation indicator of the congestion signal tag for packet 505-2 is changed from 1 to 0, and the stage indicator of the congestion signal tag for packet 505-2 is changed from 1 to 3. Regarding packet 505-3, the ABW local signal value of 3 is greater than the ABW congestion signal value of 2, so the congestion signal tag of packet 505-3 is not changed. Regarding packet 505-4, the signal type indicator is 1 and the ABW/C congestion signal value is 4, which is higher than the ABW/C local signal value of 1; and therefore the congestion signal tag of packet 505-4 is changed so that that the ABW/C local signal value of 1 is substituted for the ABW/C congestion signal value of 4, the link orientation indicator of the congestion signal tag for packet 505-4 is changed from 1 to 0, and the stage indicator of the congestion signal tag for packet 505-4 is changed from 2 to 3.

At this point operations performed at egress ports configured for the presently disclosed congestion signal processing will be discussed in more detail.

Firstly, it is noted that in embodiments the egress ports of a node may repeatedly update their local signal values. For example, the egress port 515-3 of FIG. 5 may repeatedly update the ABW and ABW/C local signal values. One way to realize such updates is to have a software agent of switch 500 repeatedly read a transmitted byte counter (tx-byte) of the egress port 515-3 while noting the time of each read, divide the change in transmitted byte counter value by the time between reads to compute port utilization, then subtract the port utilization from the port capacity to yield the ABW. ABW/C may then be computed by dividing the ABW by the port capacity. Also, the ABW and ABW/C values may be classified into one of multiple predetermined ranges to bucketize the ABW and ABW/C values (e.g., by quantizing and encoding the ABW and ABW/C values). In terms of pseudocode, the local signal value update process for a system using 8 buckets may be described as follows.

$$\text{utilization\_bw(port)} = (\text{tx-byte(port, t2)} - \text{tx-byte(port, t1)})/(t2\text{-}t1)$$
$$\text{ABW-raw(port)} = \text{capacity (port)} - \text{utilization\_bw(port)}$$

Then apply 3 bit bucketizing to get ABW(port)

$$\text{ABW/C-raw(port)} = \text{ABW(port)}/\text{capacity(port)}$$

Then apply 3 bit bucketizing to get ABW/C(port)

In any event, one or more local signal values, e.g., ABW and/or ABW/C, may be written to the egress port's access control list (ACL) memory, which may serve to implement comparison of the local signal values to received congestion signal values. For example, a local signal value may be written to an egress port's ternary content addressable memory (TCAM) ACL so that available ACL capacity may be used to effect comparison of the local signal value to a received congestion signal value and replacement of the congestion signal value with the local signal value when appropriate.

In some embodiments a software agent of a node reads a transmitted byte counter of the node by means other than an application programming interface (API) of the node. One way to read a transmitted byte counter of a node without using a node API is by reading the transmitted byte counter through an unused peripheral component interconnect express (PCIe) interface of the node. For example, a software agent of switch 500 repeatedly reads a transmitted byte counter for an egress port of the switch 500 via an unused PCIe interface of the switch 500. Reading the transmitted byte counter through an unused PCIe interface, and writing the updated local signal value back to the egress port via the PCIe interface, enables the switch 500 to update the local signal value in an amount of time on the order of 100s of microseconds. Thereby, allowing the switch 500 to provide the compare-and-replace support necessary for communicating congestion signal values on in-band packets, even for flows with very short roundtrip times. By contrast, if a transmitted byte counter of a switching ASIC is read using an API of the ASIC, e.g. the API provided by the software development kit (SDK) of the ASIC, then reading the transmitted byte counter takes on the order of 10s of milliseconds, which is too long to reveal microbursts for most flows in today's data centers. To provide line rate compare-and-replace support, the time for reading the transmitted byte counter must be on an order of magnitude smaller (or at least comparable to) the packet flow's round trip time. Further, using an SDK to read the counter captures the SDK internal clock for a significant amount of time, thereby adversely affecting the other ASIC operations, such as updating the routes in the ASIC's forwarding information base (FIB).

Figure 6:
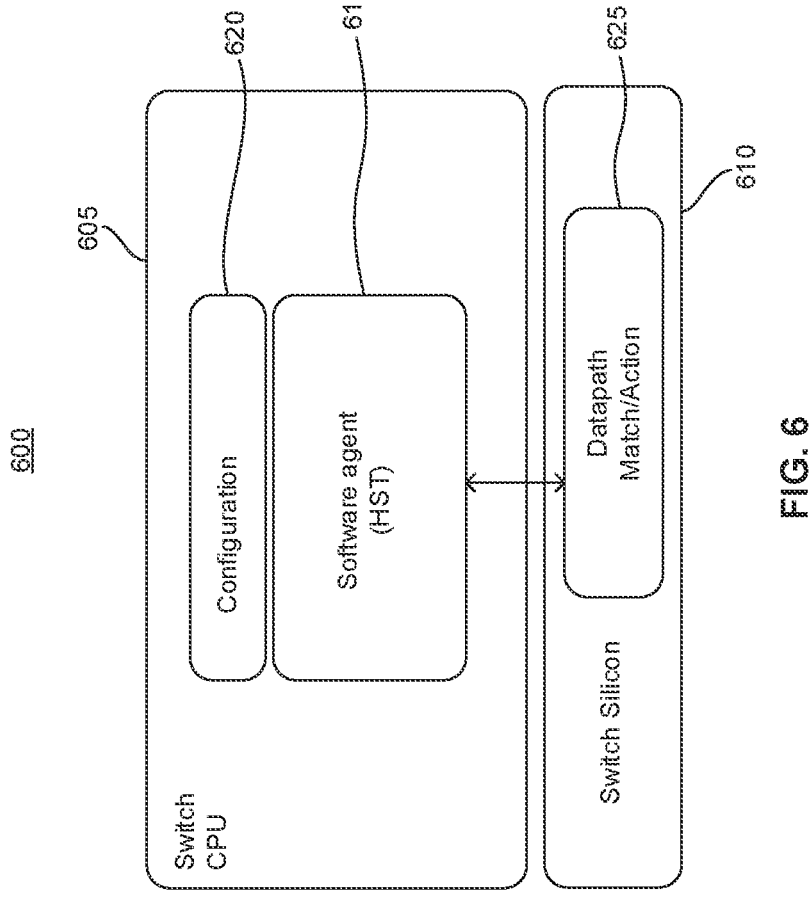
FIG. 6 is a block diagram of a switch.

FIG. 6 is a block diagram of a switch 600 for implementing the local signal value update function and the compare-and-replace function of embodiments. The switch 600 may be used as switch 500 of FIG. 5. The switch 600 includes a central processing unit (CPU) 605 that interfaces with switch silicon 610. The CPU 605 executes software agent 615, or "high speed telemetry" (HST) software, according to a programmed configuration 620. The switch silicon 610 selectively directs packets between ingress ports of the switch 600 to egress ports of the switch, performs comparison of local signal values with received congestion signal values, and replacement of received congestion signal values with local signal values when appropriate. The portion of the switch silicon 610 that performs the compare-and-replace function is referred to as a data path match/action portion 625. The data path match action portion 625 may include a TCAM with entries for all possible buckets into which received congestion signal values may fall, with each entry specifying an action to be taken. To illustrate, the case of TCAM match/action for N bit ABW congestion signal values is considered.

If N bits are used to represent ABW, compare-and-replace can be implemented using (1) or (2) as follows:

(1) $2^N$ Exact Match/Action rules

The rules enumerate all possible ABW congestion signal values on the incoming packet, and specify a write Action for a subset of them to replace the received ABW congestion signal value with the ABW local signal value.

E.g., With 3 bits, if the ABW local signal value=010, the following Exact Match/Action table implements compare-and-replace Match→Action 000→Noop 001→Noop 010→Noop 011→Write 010

100→Write 010

101→Write 010

110→Write 010

111→Write 010

(2) (N/2+1) TCAM Match/Action rules

With Ternary match, the same compare-and-replace can be implemented for the above example with just two rules:

Match→Action congestion signal value matches mask 00X→Noop congestion signal value matches mask XXX→Write 010

In another example with N=6, Ternary compare-and-replace can be implemented with just 3+1 rules when the ABW local signal value=010101:

Match→Action congestion signal value matches mask 00XXXX→Noop congestion signal value matches mask 011XXX→Write 010101 congestion signal value matches mask 01011X→Write 010101 congestion signal value matches mask XXXXXX→Noop

More specifically, the number of TCAM Match/Action rules needed to implement compare-and-replace is min(#0s, #1s)+1, where #0s is the number of 0s in the ABW local signal value, and #1s is the number of 1s in ABW local signal value. However, to cover all possible values of a received N bit ABW congestion signal value, the number of rules needed is dictated by min(#0s, #1s)=N/2+1.

Note that the ordering of the rules matters since TCAM fundamentally implements a lowest index match. Exact Match implementation vs Ternary Match implementation is a Space/Time tradeoff. When a new value of ABW local signal value is computed (e.g., by the switch 600), with Exact Match, the Match portion of the rules stays the same, and only the Action portion must be updated; whereas with TCAM Match, both the Match and Action portion of the rules must be updated.

Regarding the total rules needed across ports to implement match/action, since each egress port has its own independent ABW local signal value, the comparator approach described above must be implemented for each port separately. Thus, for example, with a 64 egress port switch, the total number of rules needed is $64 \times 2^N$ Exact Match/Action rules or $64 \times (N/2+1)$ TCAM Match/Action rules. Moreover, it is noted that for the case of a 64 egress port switch the number of rules required may be reduced when N<6 through egress port grouping. For instance, if 4 bits are used to represent ABW there can at most be 16 ABW values. So, the ports can be grouped into 16 groups based on the ABW local signal value they correspond to, and a group ID can then be attached during the port resolution stage and can be used as part of the Match key. In this manner, the total number of rules needed across ports is brought down to min (64, $2^N) \times 2^N$ for Exact Match/Action rules (e.g., N=3→64 total rules, N=4→256 total rules, N=7→8192 total rules); or min (64, $2^N) \times (N/2+1)$ for TCAM Match/Action rules (e.g., N=3→16 total rules, N=4→48 total rules, N=7→256 total rules). It should be noted that the preceding examples of total rules required for N=3, 4, and 7 are provided in the context of a single local signal value and a single link direction. Thus, for instance, if two link directions are considered for TCAM the number of Match/Action rules required for implementing compare-and-replace for a single local signal value (e.g., an ABW local signal value), with N=3, would be 32 rules; and the number of Match/Action rules required for implementing compare-and-replace for two local signal values (e.g., an ABW local signal value and an ABW/C local signal value), each with N=3, would be 64.

In some embodiments, egress port grouping may be implemented through an egress port table of a node. More specifically, updated local signal values (e.g., ABW values) may be written to an egress port table of a node (e.g., switch 500) such that when the address for a given egress port is provided to the egress port table, the updated local signal value is made part of an egress port key that will be sent to a TCAM (e.g., an ACL TCAM). Then, the TCAM can match the key to find an appropriate action (e.g., substitute the local signal value for a received congestion signal value, or do not substitute the local signal value for the received congestion signal value). In this manner, when the local signal value is updated the TCAM does not need to be updated, but rather, the egress port table is updated. That is, since the Match/Action rules applied for each local signal value do not change, the rules for each local signal value may be stored in the TCAM upon initialization and need not be updated. Thereafter, the subset of the initially stored rules applicable for a given port address is determined from the key. Thus, updates to the TCAM are avoided in favor of much faster updates to the egress port table, which may be stored in a memory such as a static random access memory (SRAM).

As an optional feature, congestion signal values may be encoded by an ingress port of a node to further reduce the number of Match/Action rules necessary to implement compare-and-replace processing. For example, a node may implement one-hot encoding for a received congestion signal value, with the encoded congestion signal value becoming part of an egress port key that will be sent to a TCAM for matching to (e.g., an ACL TCAM). Then, the TCAM can match the key to find an appropriate action.

FIG. 7 is a flow diagram showing an example of compare-and-replace processing performed by a node and including the use of ingress port encoding of congestion signal values, egress port grouping through an egress port table, and TCAM Match/Action rules. FIG. 7 is presented in the context of ABW congestion signal values (Pkt.abw) and ABW local signal values (port.abw), each bucketized into 8 buckets. The flow of FIG. 7 includes an encoding lookup part 705, a key generation part 710, and a range check ternary lookup part 715. As can be seen from the encoding lookup part 705, one-hot encoding may be performed on ABW congestion signal values received at the node such that for each of the 8 possible congestion signal values 1 bit of an 8 bit string representing the value is set to logic 1 while the remaining bits of the string are set to logic 0. The one-hot encoding may be performed at an ingress port of the node. By way of example, such one-hot encoding may be performed by an ingress ACL TCAM, by ingress VLAN translation (hash lookup), or by direct VLAN lookup (simple indexed table).

For a given received ABW congestion signal value, an encoded ABW congestion signal value 720 is generated by the encoding lookup part 705 and passed to the key generation part 710. The key generation part 710 also receives an ABW local signal value 725 from an egress port table 730, the egress port table 730 storing ABW local signal values for each egress port with the stored ABW local signal values being updated as often as possible, and the ABW local signal value 725 being retrieved by cross-referencing an egress port address 735 to the ABW local signal value 725. By way of example, the 8-bucket ABW local signal values may be stored in the egress port table 730 as bits 4:2 of respective port group IDs stored in the table 730.

Upon receiving the encoded ABW congestion signal value 720 and the ABW local signal value 725, the key generation part 710 generates a key 740 for use by the range check ternary lookup part 715. The key 740 includes the encoded ABW congestion signal value 720 and the ABW local signal value 725, and can be used with 7 Match/Action rules 715-1 to 715-7 of the range check ternary lookup part 715 to implement compare-and-replace. More specifically, the range check ternary lookup part 715 implements Match/Action rules 715-1 to 715-7 as follows:

(1) 715-1—when the key 740 indicates an ABW local signal value 725 of 0, the encoded ABW congestion signal value 720 of the key 740 is compared to a mask of 0xxx-xxxx, and if there is a match the ABW congestion signal value corresponding to the encoded ABW congestion signal value 720 is replaced with the ABW local signal value 725 (set Pkt.abw=0).

(2) 715-2—when the key 740 indicates an ABW local signal value 725 of 1, the encoded ABW congestion signal value 720 of the key 740 is compared to a mask of 00xx-xxxx, and if there is a match the ABW congestion signal value corresponding to the encoded ABW congestion signal value 720 is replaced with the ABW local signal value 725 (set Pkt.abw=1).

(3) 715-3—when the key 740 indicates an ABW local signal value 725 of 2, the encoded ABW congestion signal value 720 of the key 740 is compared to a mask of 000x-xxxx, and if there is a match the ABW congestion signal value corresponding to the encoded ABW congestion signal value 720 is replaced with the ABW local signal value 725 (set Pkt.abw=2).

(4) 715-4—when the key 740 indicates an ABW local signal value 725 of 3, the encoded ABW congestion signal value 720 of the key 740 is compared to a mask of 0000-xxxx, and if there is a match the ABW congestion signal value corresponding to the encoded ABW congestion signal value 720 is replaced with the ABW local signal value 725 (set Pkt.abw=3).

(5) 715-5—when the key 740 indicates an ABW local signal value 725 of 4, the encoded ABW congestion signal value 720 of the key 740 is compared to a mask of 0000-0xxx, and if there is a match the ABW congestion signal value corresponding to the encoded ABW congestion signal value 720 is replaced with the ABW local signal value 725 (set Pkt.abw=4).

(6) 715-6—when the key 740 indicates an ABW local signal value 725 of 5, the encoded ABW congestion signal value 720 of the key 740 is compared to a mask of 0000-00xx, and if there is a match the ABW congestion signal value corresponding to the encoded ABW congestion signal value 720 is replaced with the ABW local signal value 725 (set Pkt.abw=5).

(7) 715-7—when the key 740 indicates an ABW local signal value 725 of 6, the encoded ABW congestion signal value 720 of the key 740 is compared to a mask of 0000-000x, and if there is a match the ABW congestion signal value corresponding to the encoded ABW congestion signal value 720 is replaced with the ABW local signal value 725 (set Pkt.abw=6).

Further, it is noted that no Match/Action rule is necessary for the case of the ABW local signal value 725 being equal to the highest possible value, 7, because in such a case there is no need to replace the received ABW congestion signal value since the received ABW congestion signal value must be less than or equal to 7.

As illustrated by FIG. 7, using one-hot encoding of received congestion signal values in combination with egress port grouping and TCAM matching, reduces the number of Match/Action rules required to implement compare-and-replace beyond the number of rules required when egress port grouping and TCAM match are used without such one-hot encoding. For example, in an 8-bucket system (N=3), when using egress port grouping and TCAM match without one-hot encoding of the received congestion signal values, the number of Match/Action rules required is 16; whereas, in an 8-bucket system (N=3), when using egress port grouping and TCAM match with one-hot encoding of the received congestion signal values, the number of Match/Action rules required is 7. It should be noted that the preceding example of 7 Match/Action rules to implement compare-and-replace for an 8-bucket system (N=3)—when using egress port grouping and TCAM match with one-hot encoding—is provided in the context of a single local signal value and a single link direction. By way of comparison, to implement compare-and-replace for an 8-bucket system (N=3)—when using egress port grouping and TCAM match with one-hot encoding—in the context of two local signal values (e.g., an ABW local signal value and an ABW/C local signal value) and two link directions, the number of Match/Action rules required is (7+7)×2=28.

Embodiments of the present technology include, but are not restricted to, the following.

(1) A congestion signaling method including receiving a packet at a node, the packet having a congestion signal tag including a congestion signal value, the congestion signal value having been set by another node among one or more other nodes through which the packet has traveled; comparing the congestion signal value to a mask that is determined according to a local signal value; and replacing the congestion signal value with the local signal value when the comparing indicates that the node is a bottleneck for the packet relative to the another node.

(2) The method according to (1), wherein the congestion signal value indicates available bandwidth at the another node, and the local signal value indicates available bandwidth at the node.

(3) The method according to (2), further including, prior to comparing, updating the local signal value by measuring bandwidth utilization at the node.

(4) The method according to (1), wherein the congestion signal value indicates available bandwidth at the another node as a fraction of bandwidth capacity at the another node, and the local signal value indicates available bandwidth at the node as a fraction of bandwidth capacity at the node.

(5) The method according to (4), further including, prior to comparing, updating the local signal value by measuring bandwidth utilization at the node.

(6) The method according to (1), wherein comparing includes accessing a ternary content addressable memory (TCAM) at the node to find a matching memory location for the congestion signal value, and replacing includes replacing the congestion signal value with the local signal value when the matching memory location specifies an action of replacing the congestion signal value with the local signal value.

(7) The method according to (1), wherein the congestion signal tag further includes at least one of a signal type indicator indicating a type of value specified by the congestion signal value, a stage indicator indicating a processing stage of the another node, or a link orientation indicator indicating whether the another node is used for uplink transmission or downlink transmission.

(8) The method according to (7), wherein when the comparing indicates that the node is a bottleneck for the packet relative to the another node, the method further includes at least one of replacing the stage indicator with a local stage indicator indicating a processing stage of the node, or replacing the link orientation indicator with a local link orientation indicator indicating whether the node is used for uplink transmission or downlink transmission.

(9) The method according to (1), further including generating a key comprising the local signal value, and wherein the mask is determined based on the key.

(10) The method according to (1), further including performing one-hot encoding on the congestion signal value to generate an encoded congestion signal value, and wherein comparing the congestion signal value to the mask is performed by comparing the encoded congestion signal value to the mask.

(11) A node including at least one ingress port to receive a packet, the packet having a congestion signal tag including a congestion signal value, the congestion signal value having been set by another node among one or more other nodes through which the packet has traveled; and at least one egress port, communicatively coupled to the ingress port, to compare the congestion signal value to a mask that is determined according to a local signal value, replace the congestion signal value with the local value when the comparing indicates that the egress port is a bottleneck for the packet relative to the another node, and forward the packet to a next node.

(12) The node according to (11), wherein the congestion signal value indicates available bandwidth at the another node, and the local signal value indicates available bandwidth at the egress port.

(13) The node according to (12), wherein the egress node is further operable to, prior to comparing, update the local signal value by measuring bandwidth utilization at the egress port.

(14) The node according to (11), wherein the congestion signal value indicates available bandwidth at the another node as a fraction of bandwidth capacity at the another node, and the local signal value indicates available bandwidth at the egress port as a fraction of bandwidth capacity at the egress port.

(15) The node according to (14), wherein prior to comparing, the egress port updates the local signal value by measuring bandwidth utilization at the egress port.

(16) The node according to (12), wherein comparing includes accessing a ternary content addressable memory (TCAM) at the egress port to find a matching memory location for the congestion signal value, and replacing includes replacing the congestion signal value with the local signal value when the matching memory location specifies an action of replacing the congestion signal value with the local signal value.

(17) The node according to (11), wherein the egress port generates a key including the local signal value and determines the mask based on the key.

(18) The node according to (11), wherein the ingress port performs one-hot encoding on the congestion signal value to generate an encoded congestion signal value, and wherein the egress port compares the congestion signal value to the mask by comparing the encoded congestion signal value to the mask.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims.

The invention claimed is:

1. A congestion signaling method comprising:
receiving a packet at a node, the packet comprising a congestion signal tag including a congestion signal value, the congestion signal value having been set by another node among one or more other nodes through which the packet has traveled;
comparing the congestion signal value to a mask that is determined according to a local signal value; and replacing the congestion signal value with the local signal value when the comparing indicates that the node is a bottleneck for the packet relative to the another node, wherein comparing comprises accessing a ternary content addressable memory (TCAM) at the node to find a matching memory location for the congestion signal value, and replacing comprises replacing the congestion signal value with the local signal value when the matching memory location specifies an action of replacing the congestion signal value with the local signal value.

2. The method according to claim 1, wherein the congestion signal value indicates available bandwidth at the another node, and the local signal value indicates available bandwidth at the node.

3. The method according to claim 2, further comprising, prior to comparing, updating the local signal value by measuring bandwidth utilization at the node.

4. The method according to claim 1, wherein the congestion signal value indicates available bandwidth at the another node as a fraction of bandwidth capacity at the another node, and the local signal value indicates available bandwidth at the node as a fraction of bandwidth capacity at the node.

5. The method according to claim 4, further comprising, prior to comparing, updating the local signal value by measuring bandwidth utilization at the node.

6. The method according to claim 1, wherein the congestion signal tag further comprises at least one of a signal type indicator indicating a type of value specified by the congestion signal value, a stage indicator indicating a processing stage of the another node, or a link orientation indicator indicating whether the another node is used for uplink transmission or downlink transmission.

7. The method according to claim 6, wherein when the comparing indicates that the node is a bottleneck for the packet relative to the another node, the method further comprises at least one of replacing the stage indicator with a local stage indicator indicating a processing stage of the node, or replacing the link orientation indicator with a local link orientation indicator indicating whether the node is used for uplink transmission or downlink transmission.

8. The method according to claim 1, further comprising generating a key comprising the local signal value, and wherein the mask is determined based on the key.

9. The method according to claim 1, further comprising performing one-hot encoding on the congestion signal value to generate an encoded congestion signal value, and wherein comparing the congestion signal value to the mask is performed by comparing the encoded congestion signal value to the mask.

10. A node comprising:

at least one ingress port to receive a packet, the packet comprising a congestion signal tag including a congestion signal value, the congestion signal value having been set by another node among one or more other nodes through which the packet has traveled; and at least one egress port, communicatively coupled to the ingress port, to compare the congestion signal value to a mask that is determined according to a local signal value, replace the congestion signal value with the local value when the comparing indicates that the egress port is a bottleneck for the packet relative to the another node, and forward the packet to a next node, wherein comparing comprises accessing a ternary content addressable memory (TCAM) at the egress port to find a matching memory location for the congestion signal value, and replacing comprises replacing the congestion signal value with the local signal value when the matching memory location specifies an action of replacing the congestion signal value with the local signal value.

11. The node according to claim 10, wherein the congestion signal value indicates available bandwidth at the another node, and the local signal value indicates available bandwidth at the egress port.

12. The node according to claim 11, wherein the egress node is further operable to, prior to comparing, update the local signal value by measuring bandwidth utilization at the egress port.

13. The node according to claim 10, wherein the congestion signal value indicates available bandwidth at the another node as a fraction of bandwidth capacity at the another node, and the local signal value indicates available bandwidth at the egress port as a fraction of bandwidth capacity at the egress port.

14. The node according to claim 13, wherein prior to comparing, the egress port updates the local signal value by measuring bandwidth utilization at the egress port.

15. The node according to claim 10, wherein the egress port generates a key comprising the local signal value and determines the mask based on the key.

16. The node according to claim 10, wherein the ingress port performs one-hot encoding on the congestion signal value to generate an encoded congestion signal value, and wherein the egress port compares the congestion signal value to the mask by comparing the encoded congestion signal value to the mask.

* * * * *